March 23, 1926.

F. P. MANSBENDEL 1,577,920

SOUND TRANSLATING DEVICE

Filed Sept. 30, 1922   4 Sheets-Sheet 1

Fritz P. Mansbendel
INVENTOR

BY
ATTORNEY

March 23, 1926.

F. P. MANSBENDEL 1,577,920

SOUND TRANSLATING DEVICE

Filed Sept. 30, 1922    4 Sheets-Sheet 2

Fritz P. Mansbendel
INVENTOR

BY

ATTORNEY

March 23, 1926.

F. P. MANSBENDEL 1,577,920.

SOUND TRANSLATING DEVICE

Filed Sept. 30, 1922    4 Sheets-Sheet 3

Fritz P. Mansbendel
INVENTOR

BY

ATTORNEY

March 23, 1926.  1,577,920
F. P. MANSBENDEL
SOUND TRANSLATING DEVICE
Filed Sept. 30, 1922    4 Sheets-Sheet 4

Fritz P. Mansbendel
INVENTOR
ATTORNEY

Patented Mar. 23, 1926.

1,577,920

UNITED STATES PATENT OFFICE.

FRITZ P. MANSBENDEL, OF BROOKLYN, NEW YORK.

SOUND-TRANSLATING DEVICE.

Application filed September 30, 1922. Serial No. 591,443.

*To all whom it may concern:*

Be it known that I, FRITZ P. MANSBENDEL, a citizen of France, and a resident of Brooklyn, in the county of Kings and State of New York, have invented certain new and useful Improvements in Sound-Translating Devices, of which the following is a specification.

The invention relates to acoustic apparatus or sound translating devices such as "loud speaking receivers", and to devices for transmitting and reproducing sound, more particularly to apparatus of this character operating thru variations in telephonic current.

It has for its object to dispense, in such apparatus, with the generally employed metallic or like diaphragm of comparatively small area as the specific sound receiving or emitting member, as well as with the amplifying horn or resonator commonly associated therewith, for example as a loud speaking attachment. In the use of these diaphragms with horns or the like, distorting effects are produced which are superimposed on the original sound waves emitted or transmitted. Inasmuch as the iron diaphragm, as generally employed in a receiver, does not exceed in diameter some two or three inches, the degree of loudness or intensity of the sound produced by its vibrations depends solely on the amplitude of such vibrations. However, an appreciable increase in volume of sound, especially of the lower notes, is not obtainable from such diaphragms even by substantially increasing the vibrations thru increase of input current, unless the sound waves thus produced be thereafter transmitted thru a magnifying or amplifying horn or resonator member, thereby setting in vibration a large column of air and resulting in a better utilization of the sound energy radiated at high intensity from the vibrating diaphragm. Unfortunately, the vibrations of a metal or like diaphragm of relatively small size, when its amplitude exceeds a safe lower limit, introduce objectionable surtones into the original sound, making the same metallic and unnatural. The reason for such distortion lies mainly in the fact that the diaphragm possesses appreciable inertia and therefore can not follow faithfully the comparatively small controlling forces, and that the vibrations when excessive cause whipping or buckling of the diaphragm, with its peculiar and dominant metallic sound. Further distortion of the reproduced sound is caused by the amplifying horn itself, which superimposes additional surtones to the sound, or changes its true character, the sound being peculiar to the shape or material of horn employed—all of which results in an unnatural rendering of the original sound.

In order to obtain a sufficient volume of undistorted sound from a telephonic responsive device (I have found that with a given amount of input energy, the forces controlling the vibration of the sound emitting member must be appreciably increased, which can be accomplished by correspondingly decreasing the amplitude of the vibration of said member. By greatly increasing the control forces, and correspondingly decreasing the amplitude of vibration, a more positive control of the sound radiating member is obtained, objectionable vibrations being suppressed or substantially eliminated. To obtain the full utilization of the energy available, without the employment of a horn, the area of the sound radiating member must be greatly increased over the present practice, with the result that the total amount of sound emitted is large, even though the intensity of the sound emitted per unit of area is low. Such sound of low specific intensity is more pleasing to the human ear, and can best be compared to light properly diffused as against a small but brilliant source of light of high specific intensity.

To accomplish these results, an arrangement is employed which comprises a primary system or motor element, and a secondary system or load element, the former translating vibrations of telephonic currents into mechanical vibrations, the latter transforming and radiating the energy transmitted to it by the motor element. The motor element or primary system of the apparatus is a self-contained and independently vibrating system, producing no useful sound and consisting of an electro-magnet acting upon a single vibrating element. The vibrating element, for example a vibrating reed or spring armature, is designed to transform all input electrical energy into mechanical vibrations of said reed with the minimum of loss thru friction; and the said system includes a base which is proportioned to effectively oppose large reactive forces to the control forces or mechanical vibrations of the vibrating member for the purpose of rendering available for useful work the maximum value of these control forces vibrating the reed and to reduce to a minimum the neutralizing effect of any reactive vibration or recoil of the member to which the reed is attached.

The load element or secondary system consists of a frame to which is attached a membrane of comparatively large surface, of light weight and provided with a light bridge structure or vibration distributing member attached thereto and which receives and distributes vibrations of the controlling member, in the shape of a vibratory reed hereinbefore noted, thereby vibrating a large portion of the membrane. The motor element, furthermore, is so mounted as to be adjustable as a whole to vary the pressure maintained between bridge and vibratory reed, as well as for varying the air gap between the latter and its associated electro-magnet.

The nature of the invention, however, will best be understood when described in connection with the accompanying drawings, in which—

Similar characters of reference designate corresponding parts thruout the several views.

Figure 1:
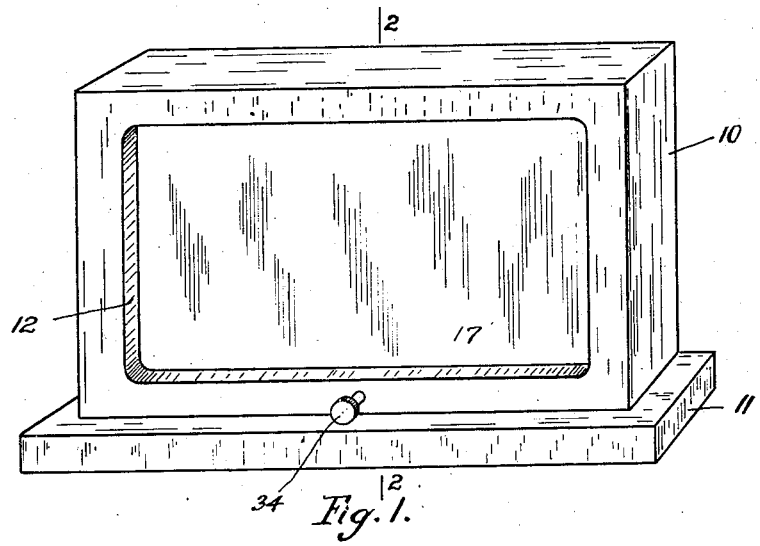
Fig. 1 is a perspective view of the improved apparatus.
Figure 2:
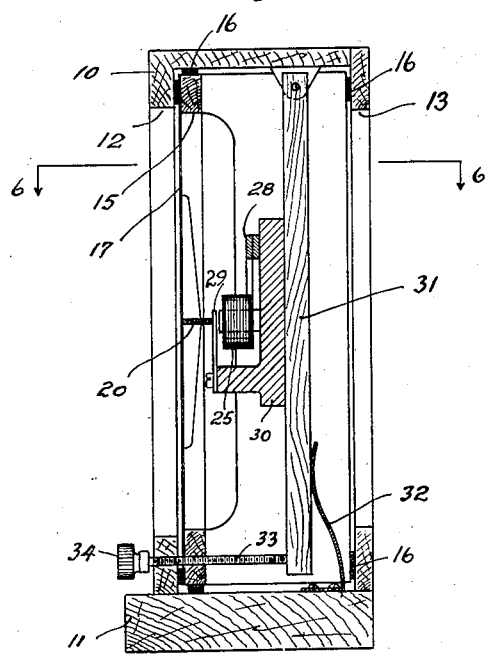
Fig. 2 is a transverse section therethru and taken on the line 2—2, Fig. 1.
Figure 3:
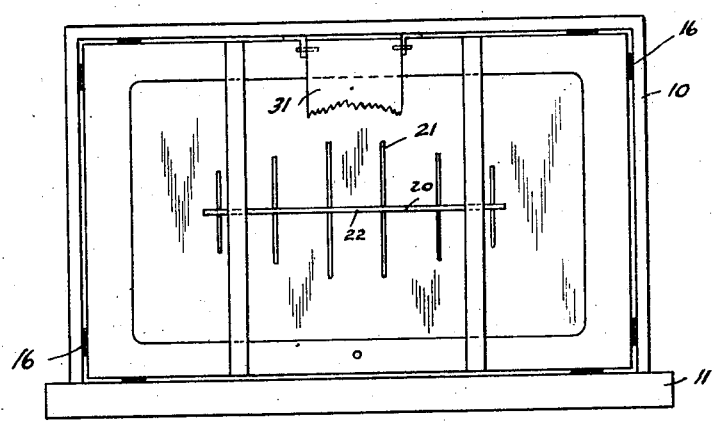
Fig. 3 is a rear view, with the back cover removed and a portion of the mechanism broken away.

Referring to the drawings, 10 designates a casing or housing having a base 11, a front opening 12; and, if desired, a rear opening 13, as shown. This housing may be of any desired contour, and within the same is mounted a frame 15 which is preferably acoustically insulated from the casing thru felt strips or the like 16 and may be of appreciable mass to offer maximum reaction to the vibrations of the membrane or like member 17. The latter is attached to the frame and arranged behind the front opening 12; and has, preferably, a major and minor axis. This membrane constitutes an independent vibrating medium and consists of material such as treated paper, vellum, parchment, drum-head skins or the like. Said membrane, moreover, is of an area of from 25 to 50 times that of the ordinary metal or other diaphragm employed in telephonic receivers; and may be tensioned in manner hereinafter set forth.

Figure 7:
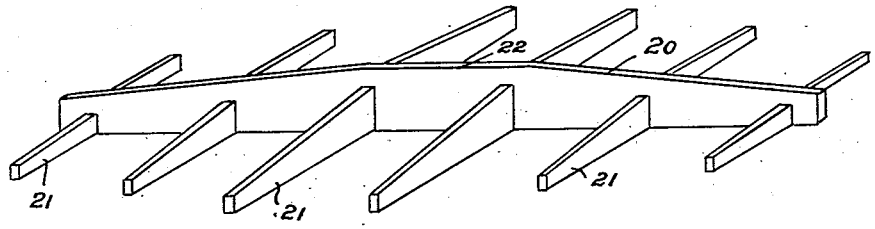
Fig. 7 is a perspective view of the bridge or distributor member.

To the rear or inner face of the membrane or sound radiating surface is attached the vibration transmitting bridge, which is of light and stiff material, and is more particularly shown in Fig. 7 as consisting of a central strip 20 extending along the major axis of the membrane, having preferably a plurality of laterally disposed arms or cross-strips 21. The centrally disposed strip has also a ridge portion 22 at the middle thereof and parallel to the bottom, which ridge portion is designed to receive the vibrations from the vibratory reed, hereinafter more fully described, and which is shown to contact therewith, but whose vibrations may be otherwise transmitted thereto if desired. The vibration distributing bridge, while essentially very light in weight, should be rigid enough to transmit the vibrations imparted thereto at the middle 22 of its ridge portion, to the end of each branch or cross-strip and without appreciable loss thru flexure. Moreover, it is not essential that the membrane and its vibration distributing bridge be separate units, as the same may be formed of suitable material moulded or pressed into a single unit which may have provided thereon ridges corresponding to the strips 20 and 21.

The hereinbefore described membrane and carrying frame together with the vibration distributing bridge constitute what I term the secondary system or load element of the apparatus.

Figure 4:
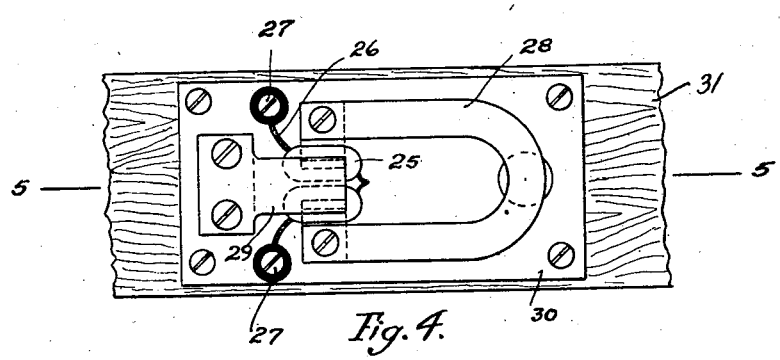
Fig. 4 is a detail plan of the primary system or motor element.
Figure 5:
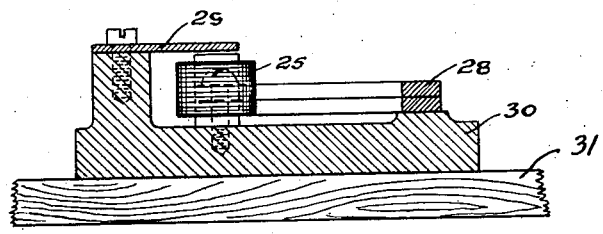
Fig. 5 is a vertical section thereof, taken on the line 5—5, Fig. 4.
Figure 6:
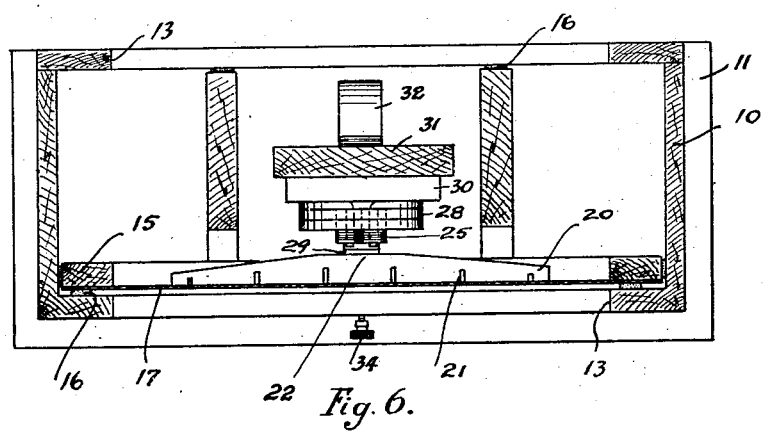
Fig. 6 is a horizontal section, taken on the line 6—6, Fig. 2, looking in the direction of the arrows.

The primary system or motor element comprises an electro-magnet 25, Figs. 4 and 5, designed to be influenced by the variation of telephonic current, as is well understood, suitable leads 26 being taken therefrom to binding connections 27. A permanent magnet 28 is provided for polarizing the electro-magnets acting upon a reed 29, one end of the latter as well as the permanent and the electro-magnets being rigidly secured to a heavy, non-magnetic base 30, as shown, and held thereto in a manner to be an integral part thereof. The mass of the base must be sufficiently large, relatively to the mass of the reed to offer maximum reaction to the forces vibrating said reed, and thereby substantially eliminate the neutralizing effect of the reactive vibration or recoil of the base. A minute air gap, of the order of 1 to 3-one-thousandths of an inch, is maintained between the vibrating end of the reed and the pole faces of the electro-magnet, the reed being of substantial construction and of the proper stiffness to enable it to vibrate freely without striking the pole pieces of the magnets. For this purpose, the reed may be made of hardened steel of a thickness of approximately 1/16 of an inch, or of non-magnetic material tipped with magnetic material; and its natural pitch, when rigidly secured at its end to the base, is preferably high for best results, as of the order of 1000 to 2000 cycles per second. In view of the minute air gap and the appreciably heavier cross-section of the reed, the reluctance of the magnetic circuit and the density of the magnetization of the reed is reduced, thereby greatly improving the efficiency of the magnetic circuit, and therefore of the energy transformation.

The primary system, as a unit, is supported from a base 31 which is shown suspended from and hinged to the upper rear portion of the casing; and is held in predetermined position relatively thereto by means of a flat spring 32, pressing against one face thereof, and by an adjustable screw 33 which presses against the other face in opposition to the tension of the spring. This screw is rotatably mounted in the casing and is provided with a knob 34 at the exterior thereof for adjusting the screw to change the position of the support 31, and thereby to alter the pressure relationship between the primary and secondary system of the apparatus, as well as to effect through this change in pressure a variation and close control of the air gap between the reed 29 and the poles of the associated electro-magnets 25.

In order to insure proper working conditions, the combination of the two systems consisting of this membrane and the coupled associated primary system must be aperiodically damped, which can be accomplished by making the area of the membrane of such size that the maximum energy produced by the primary system and communicated to the secondary system is all converted into sound waves and none is left to build up local resonance of a portion of the membrane. Owing to the large surface provided, and controlled by the actuating reed hereinbefore described, the amount or volume of sound radiated is many times greater than that which the reed member alone could emit in view of its relatively small surface and small amplitude of vibration, and is quite sufficient to permit of dispensing with an amplifying horn.

Under "independently vibrating primary system" I therefore understand the combination of polarized electro-magnet and associated reed, securely and rigidly fastened to a common support, said reed being capable of vibrating under the influence of variations of the telephonic current passing thru the electro-magnet, and possessing inherently all resiliency required to respond to the entire range of frequencies of the vibrations produced by the varying telephonic currents without depending for resiliency on the stiffening action of the membrane to render it responsive.

Under "independently vibrating secondary system" I therefore understand a membrane of light weight and of relatively large area, provided with a vibration distributing member and supported in a frame, all movements of said membrane being controlled by and in accordance with the vibration imparted to it by the reed of the primary system, and faithfully following these vibrations notwithstanding the membrane's own unavoidable inertia.

Under the term "reed" I therefore understand a strip of inherently resilient metal securely and rigidly attached at one of its ends to a support of substantial mass, the other end being free to vibrate to and fro under the influence of a force varying in intensity and acting in line with the applied load on the reed or so near thereto as not to cause the reed to flex between the points of applied force and load.

Figure 8:
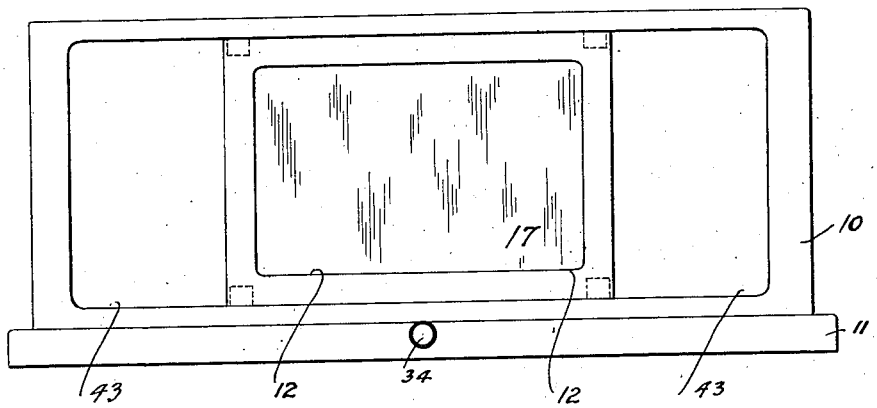
Fig. 8 is a front elevation.
Figure 9:
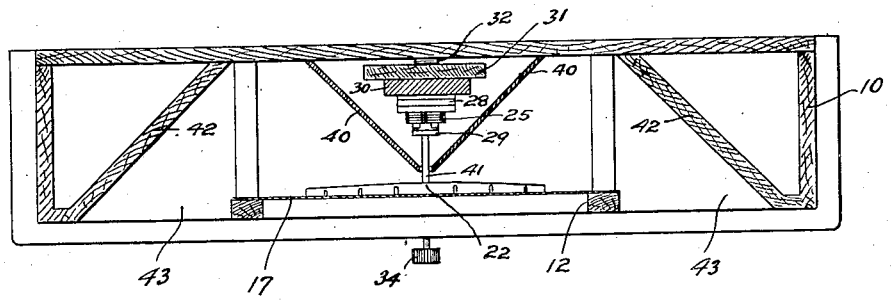
Fig. 9 is a horizontal section illustrating a modification.

In the modification illustrated in Figs. 8 and 9, the rear opening in the casing 10 is closed so that no sound, radiated from the rear of the membrane 17, will be emitted from the back of the casing. Instead, the sound rearwardly radiated is arranged to be reflected from the exterior surface of walls 40 angularly disposed behind the membrane and shown as enclosing the primary element, and thru the apex of which walls passes a rod or post 41 which connects the reed 29 with the portion 22 of the spreader. The sound waves impinging on these walls are thereby directed laterally to further cooperating reflecting walls 42, arranged at the proper angle to deflect the sound waves outwardly from the front of the casing thru openings 43 arranged on either side of the opening 12. Substantially the entire sound radiated from the membrane is thus delivered from the front of the casing 10 thru the openings 12 and 43. In many cases, this is particularly desirable; and the result has been attained without increasing the depth of the casing and thus insuring a compact and hornless loud speaker.

As hereinbefore set forth, the vibrating end of the reed contacts directly or indirectly with the portion 22 of the vibration distributing bridge, under a predetermined pressure, thru the action of the spring 32 and screw 33, the reed 29 and the bridge portion 22 forming a pivotal bearing. This pressure provides the tensioning of the membrane, a condition which is essential in order to insure the membrane following faithfully all vibrations of the reed. The vibrations of the reed are thus communicated to the major portion of the surface of the membrane 17, causing same to vibrate in unison with the reed and to emit sound in considerable volume. Likewise, in the reverse operation of the apparatus, controlling forces of considerable magnitude are produced by sound impinging on the relatively large surface of the membrane, and corresponding variations of the telephonic current in the electro-magnets will be induced under the action of the reed thru the vibrations imparted thereto from the membrane.

It will be appreciated, also, that a plurality of such primary elements or motors may be arranged to act upon various portions of the bridge common to the membrane, which membrane in this case would be proportionately increased in area.

The sound emitted from the improved apparatus, is more evenly diffused; and, being of lower pressure, is more pleasing to the ear. The use of a large surface as a sound-radiating member produces, also, the novel and unusual illusion as if the sound originated directly back of the surface. With proper relations established between the various parts of the primary and secondary systems, the correct proportions of tone values are maintained, and all of the notes will be rendered in accordance with their true values as represented by the undulations of the telephonic current or input energy.

I claim:—

1. In an acoustic apparatus, the combination of a sounding member, a magnetic reed associated therewith, electro-magnetic means acting directly on said reed to vibrate the same, and means for creating a strain between said reed and said member, the point of engagement between said reed and said member being substantially in line with the resultant of the electro-magnetic forces acting upon said reed.

2. In an acoustic apparatus, the combination of a sounding member, a hardened steel reed associated with said member, electro-magnetic means acting directly on said armature to vibrate the same, and means for creating a strain between said reed and said member, the point of engagement between said reed and said member being substantially in line with the resultant of the electro-magnetic forces acting upon said reed.

3. In acoustic apparatus of the character set forth: the combination of a sounding member of relatively large area and exposed on both side to free and unconfined air, a magnetic reed associated with said member, electro-magnetic means acting directly on said reed to vibrate the same, and means for creating a strain between said reed and said member.

4. In an acoustic apparatus, a rigidly held vibratory reed of magnetic material, an electro-magnet associated therewith to vibrate said reed, a sound radiating member, an intermediate vibration transmitting member interposed between said reed and said sound radiating member, and means for creating a strain between said reed and said vibration transmitting member, the point of engagement between said reed and said vibration transmitting member being substantially in line with the resultant of the electro-magnetic forces acting upon said reed.

5. In acoustic apparatus: a rigidly held vibratory reed of magnetic material, an electro-magnet associated therewith to vibrate said reed, a support of mass sufficient relatively to the reed to counteract reactive forces between the reed and support to eliminate recoil of the latter, a sound radiating member coupled with said reed, and means for flexing the vibrating end of said reed and thereby varying the normal air gap between the reed and the associated electro-magnet.

6. In acoustic apparatus: a membrane, a vibration transmitting member secured thereto, and electro-magnetic means including a vibratory reed of magnetic material to be vibrated thereby and coupled with the said vibration transmitting member for vibrating the membrane, the reed being rigidly mounted and in the field of the magnets, and the membrane being of an area to provide sufficient loading of the vibrating system for it to become aperiodically damped.

7. In an acoustic apparatus, a membrane, a vibration transmitting member secured thereto, electro-magnetic means including a vibratory reed of magnetic material, said reed being coupled with said vibration transmitting member for vibrating the membrane, a casing for housing the parts, and means accessible from the exterior of the casing for flexing said reed and thereby adjusting the position of the vibrating end of said reed relatively to the electro-magnet.

8. In an acoustic apparatus, a membrane, a vibration transmitting member secured thereto and provided with a central ridge having a straight portion, and electro-magnetic means including a vibratory reed of magnetic material, said reed engaging the straight portion of said ridge throughout substantially the entire width of the reed.

9. Acoustic apparatus, comprising: a casing provided with an opening, a frame mounted therein, a membrane carried by said frame and in communication with the said opening, a vibration transmitting member secured to the membrane, and electro-magnetic means including a vibratory reed of magnetic material to be vibrated thereby, said reed engaging said vibration transmitting member and forming a pivotal bearing therewith.

10. Acoustic apparatus, comprising: a casing provided with an opening, a frame mounted therein and acoustically insulated therefrom, a membrane attached to said frame and in communication with said opening, a distributor member secured to the membrane and provided with a central ridge, and electro-magnetic means including a vibratory reed of magnetic material to be vibrated thereby, said reed being coupled with the ridge of the said distributor.

11. Acoustic apparatus, comprising: a casing provided with an opening, a frame mounted therein, a membrane carried by said frame and in communication with said opening, a vibration distributor member secured to the membrane, a second frame suspended from said casing and movably supported therein, and electro-magnetic means mounted on said second frame and including a vibratory reed of magnetic material to be vibrated thereby, said reed being coupled with the said distributor.

12. Acoustic apparatus, comprising: a casing provided with an opening, a frame mounted therein, a membrane carried by said frame and in communication with said opening, a vibration distributor member secured to the membrane, a second frame yieldably and adjustably supported in the casing, and electro-magnetic means mounted on said second frame and including a vibratory reed of magnetic material to be vibrated thereby, said reed being coupled with the said distributor.

13. Acoustic apparatus, comprising: a casing provided with an opening, a frame mounted therein, a membrane carried by said frame and in communication with the said opening, a vibration distributor member secured to the membrane, a second frame movably supported in the casing, electro-magnetic means mounted on said second frame and including a vibratory reed of magnetic material to be vibrated thereby, said reed being coupled with the said distributor, and means outside the first-named frame for effecting movement of the second-named frame.

14. Acoustic apparatus, comprising: a casing provided with an opening therein, a membrane on said frame and in communication with said opening, a vibration distributor member carried by the membrane, a second frame yieldably and adjustably supported in the casing, electro-magnetic means mounted on said second frame and including a vibratory reed of magnetic material to be vibrated thereby, said reed being coupled with the said distributor, a spring secured at one end to the casing and its free end bearing against said second frame, and a screw extending to the outside of said casing and having its inner end in engagement with the said second frame in opposition to the tension of said spring.

15. In an acoustic apparatus, an electromagnet provided with a pole piece, a vibratory magnetic reed, the vibratory end of said reed facing and extending across said pole piece but spaced therefrom by less than three thousandths of an inch, a sounding member comprising a vibration transmitting member attached to said sounding member and in pivotal engagement with the vibratory end of said reed, and means for establishing a normal strain between said reed and said vibration transmitting member.

16. In an acoustic apparatus, an electromagnet provided with a pole piece, a vibratory magnetic reed, the vibratory end of said reed facing and extending across said pole piece but spaced therefrom, a sounding member comprising a vibration transmitting member attached to said sounding member and in pivotal engagement with the vibratory end of said reed, and means for establishing a normal strain between said reed and said vibration transmitting member.

17. In an acoustic apparatus, an electromagnet provided with a pole piece, a vibratory magnetic reed, the vibratory end of said reed facing said pole piece and extending across the same but spaced therefrom by less than three thousandths of an inch, a sounding member comprising a vibration transmitting member attached to said sounding member and in pivotal engagement with the vibratory end of said reed, and means for creating a normal strain between said reed and said vibration transmitting member.

18. In an acoustic apparatus, the combination of a membrane, a fixed member to which said membrane is attached, a magnetic reed, electro-magnetic means acting directly on said reed for vibrating the same, means for transmitting vibrations from said reed to said membrane, and pressure means for flexing said reed and thereby creating a normal strain between said reed and said vibration transmitting member.

19. In an acoustic apparatus, an electromagnet provided with two side by side pole pieces, a vibratory magnetic reed, the vibratory end of said reed spanning the pole pieces of said electro-magnet but spaced therefrom by less than three thousandths of an inch, a sounding member, a vibration transmitting member attached to said sounding member and in pivotal engagement with the vibratory end of said reed, and means for creating a normal strain between said reed and said vibration transmitting member.

20. In an acoustic apparatus, an electromagnet provided with two side by side pole pieces, a vibratory magnetic reed, the vibratory end of said reed spanning the pole pieces of said electro-magnet but spaced therefrom by less than three thousandths of an inch, a sounding member, a vibration transmitting member attached to said sounding member and in pivotal engagement with the vibratory end of said reed, and means for creating a normal strain between said reed and said vibration transmitting member, the point of engagement between said reed and said vibration transmitting member being substantially in line with the resultant of the magnetic forces acting upon said reed.

21. In an acoustic apparatus, an electromagnet provided with two side by side pole pieces, a vibratory magnetic reed, the vibratory end of said reed spanning the pole pieces of said electro-magnet but spaced therefrom by less than three thousandths of an inch, a sounding member of relatively large area and exposed on both sides to free and unconfined air, a vibration transmitting member attached to said sounding member and in pivotal engagement with the vibratory end of said reed, and means for creating a normal strain between said reed and said vibration transmitting member, the point of engagement between said reed and said vibration transmitting member being substantially in line with the resultant of the magnetic forces acting upon said reed.

Signed at New York, in the county of New York and State of New York, this 28th day of September A. D., 1922.

FRITZ P. MANSBENDEL.